Nov. 15, 1938.  J. M. LEDNUM  2,136,513
YEAR-ROUND AIR CONDITIONING SYSTEM
Filed May 4, 1935  2 Sheets-Sheet 2
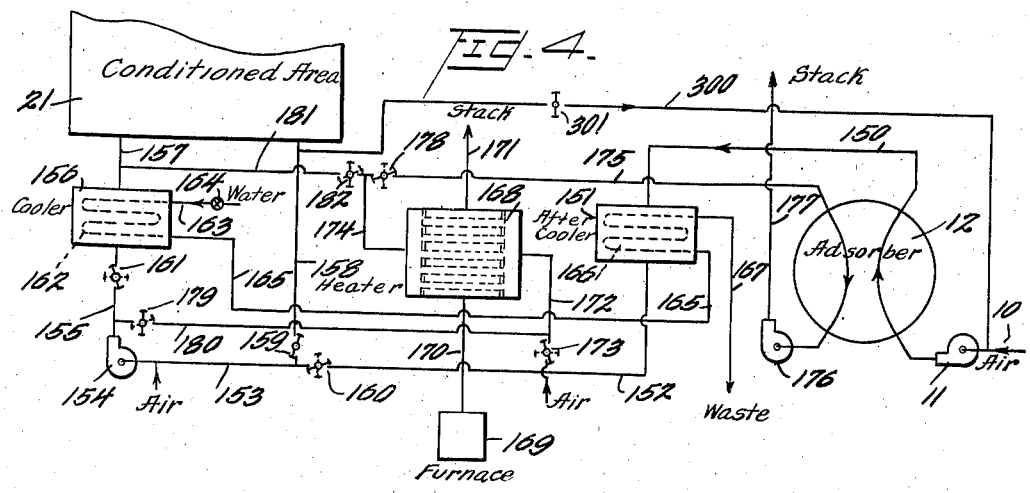
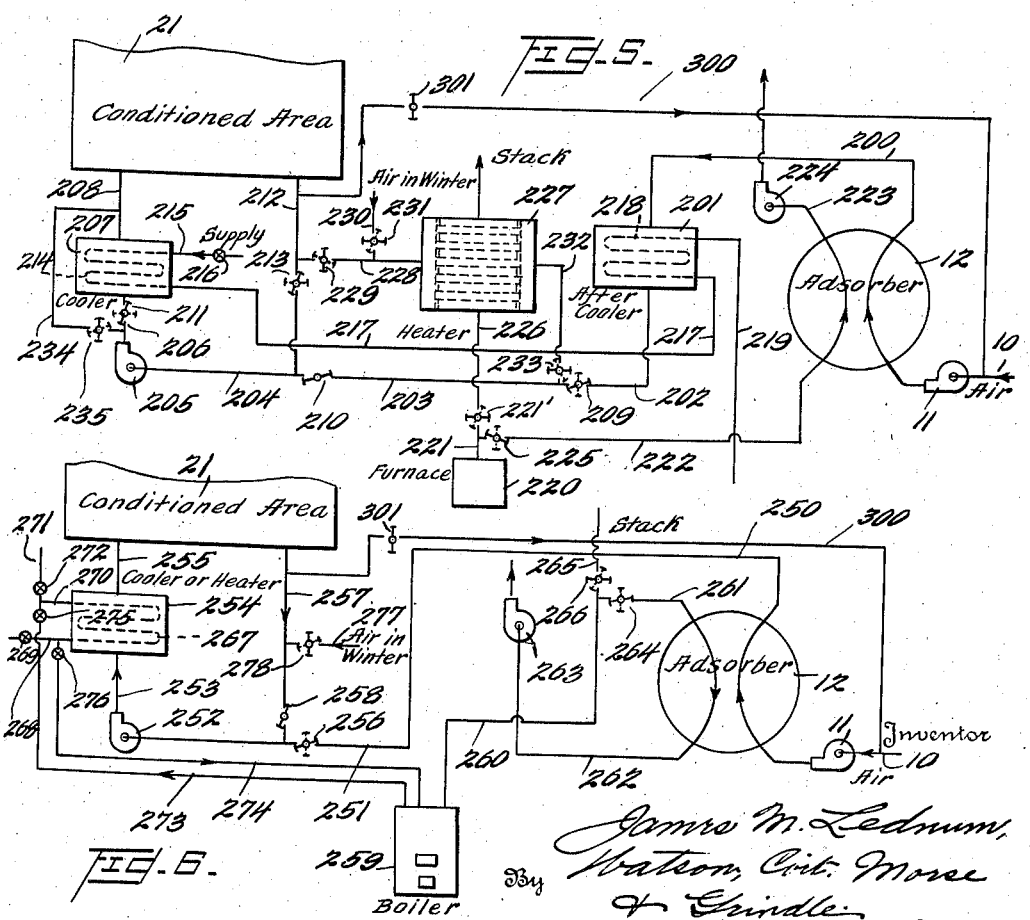

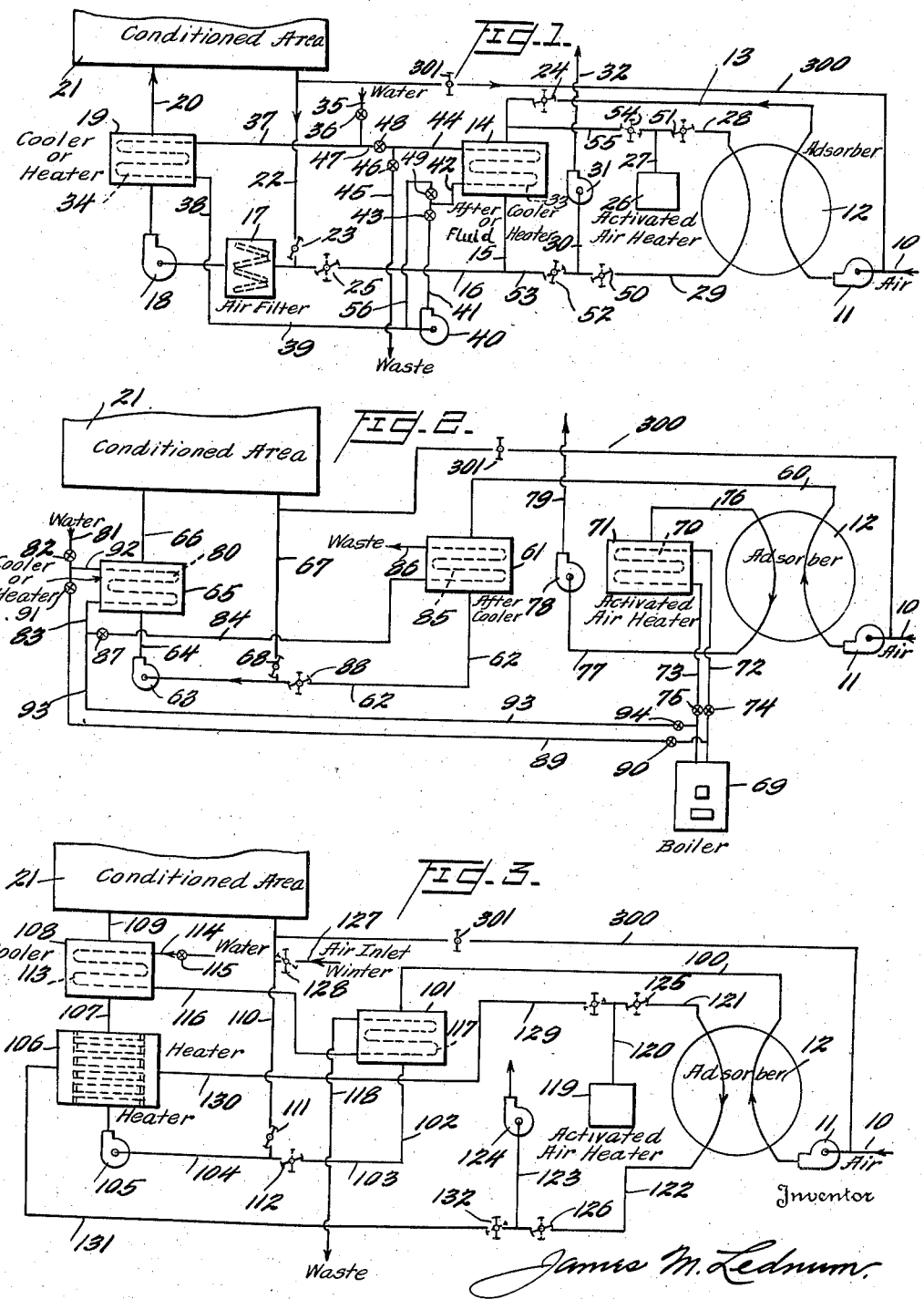

Patented Nov. 15, 1938

2,136,513

UNITED STATES PATENT OFFICE 2,136,513

YEAR-ROUND AIR CONDITIONING SYSTEM

James M. Lednum, Baltimore, Md., assignor, by mesne assignments, to The Davison Chemical Corporation, Baltimore, Md., a corporation of Maryland Application May 4, 1935, Serial No. 19,871

2 Claims. (Cl. 183—4)

The present invention relates to systems for conditioning air supplied to a space such as a room, house, auditorium or the like. More particularly it relates to systems for year-round operation, and of the type employing an adsorber charged with a solid porous moisture adsorbent material such as silica gel, activated alumina, activated carbon or the like.

In such systems, usually, the adsorber containing the solid moisture adsorbent material may be regenerated or activated by heat. Some of the air fed to the space to be conditioned is intensely dried by passing through such material. It is then mixed with air withdrawn from the space, and the mixture is cooled and introduced into the space. If desired, the dried air, after it leaves the adsorbent may have its temperature lowered by passing the same through an after cooler. Any suitable source of heat is provided for regenerating or activating the adsorber.

One of the objects of the present invention is to provide a simple system of this type that requires a minimum capital investment and minimum operating costs.

Another object is to utilize the device that furnishes heat to activate the moisture adsorbent when in operation during the summer, for the purpose of heating the air supplied to the space in winter, the adsorber being inoperative in winter.

Another object of the invention is to utilize the after cooler, for winter operation, to heat water and supply the same to the main cooler to be used to heat air introduced into the space.

Another object of the invention is to employ a boiler as a source of heat and use the combustion gases therefrom to heat air to activate the adsorber in summer, and in winter use hot water from the boiler in the main cooler to heat the air introduced into the space.

Another object of the invention is to heat air to activate the adsorber in the summer time and in winter use the hot air in a heater to raise the temperature of the air introduced into the space.

Another object is to provide an air heater, heated by hot combustion gases to furnish hot air for activation in summer, and in winter to use this same heater to heat air supplied to the space.

Another object of the invention is to employ combustion gases from a furnace to activate the adsorber in summer, and in winter to heat a heater through which air supplied to the space is passed.

Another object is to use a single cooler to act as an after cooler and a main cooler.

Another object is to use the combustion gases from a boiler to activate the adsorber in summer and in winter employ hot water from the boiler to heat the cooler and raise the temperature of air supplied to the space.

Other objects and features of novelty will be apparent from the description taken in connection with the drawings in which:

Fig. 1 is a schematic or diagrammatic view of one embodiment of the invention.

Figs. 2 to 6 inclusive are similar views of modified forms of the invention.

Briefly stated, the system according to the present invention includes an adsorber for drying some air which is mixed with air withdrawn from the space and the mixture introduced into the space. Means is provided to cool the air supplied to the space in summer and heat it in winter.

The adsorber may be of any suitable construction employing a porous solid adsorbent material capable of drying air by adsorbing moisture therefrom whether the moisture be present as a vapor or in other form. The adsorbent should act to dehydrate the air continuously, that is to say, without interruption. For this purpose one known form of adsorber comprises two units having stationary beds of adsorbent, each unit alternating with the other on the adsorption and activation phases of its cycle. In another known form the bed of adsorbent is rotated so that successive portions are subjected first to the adsorption phase and then to the activation phase.

In the figures of the drawings, dampers are shown in full lines for the positions they assume during summer operation. If the adjustment is changed for winter, the latter positions are shown in dotted lines.

Referring to the form of the invention illustrated in Fig. 1, air to be dried is supplied through the duct 10 to blower 11 which delivers the same for passage through the adsorber 12. As previously stated, the adsorber contains a porous solid adsorbent material capable of dehydrating air, such as silica gel, activated alumina, activated carbon or the like. The dried air discharged from the adsorber is conveyed by a duct 13 to an after cooler 14 of any suitable type wherein the temperature of the air, which has been raised by the dehydration, is lowered a desired amount. From the after cooler 14, the dried, cooled air passes through duct 15, into a duct 16, through a filter 17 to a blower 18, which discharges the air through the cooler 19 of any suitable construction and introduces it by duct 20 into the conditioned space 21.

Air may be withdrawn from the conditioned area through the duct or conduit 22 and delivered into the conduit 16 at a point between the after cooler 14 and the main cooler 19 where it mixes with the dehydrated air from the adsorber. A suitable damper 23 may be provided in duct 22 to control the flow of air therein. Normally this valve is open during both summer and winter operation.

Suitable dampers 24 and 25 may be provided in the conduits 13 and 16 respectively for a purpose presently to be described.

In order to activate or regenerate the adsorbent in the adsorber, a heater 26 is provided to heat air, the hot air being discharged through ducts 27 and 28 and thence through the adsorber to duct 29 which connects with duct 30 supplying the fan 31. The exhaust from this fan may be discharged into the atmosphere through duct 32.

Coolers 14 and 19 are provided with cooling coils 33 and 34 respectively. Cooling water is supplied through pipe 35, the flow being controlled by valve 36. In summer operation, this cooling water from pipe 35 is discharged into pipe 37 that supplies coil 34 of the main cooler 19. From this coil the water is discharged through pipes 38 and 39 to a pump 40 which supplies cooling coil 33 through pipes 41 and 42. The valve 43 is disposed in pipe 41 to control the flow. From coil 33 water is discharged through pipes 44 and 45 to waste, the valve 46 being provided in pipe 45. Pipes 44 and 37 are connected by a pipe 47 having a valve 48 therein. For summer operation, valves 36, 43 and 46 are opened, and valves 48 and 49 closed. The cooling water therefore passes through the main cooler first, thence to pump 40, thence to the after cooler 14, and finally to waste.

For winter the adsorber is inoperative and water is heated in the after cooler 14 and supplied to the main cooler 19 so that the latter becomes a heater for heating air supplied to the conditioned area. In winter operation, dampers 50 and 51 in ducts 29 and 28 respectively are closed, and damper 52 in duct 53 is opened. Hot air from the activating air heater 26 is taken from duct 27, by open damper 54 in duct 55, and passes through the cooler 14 to heat water in the coil 33. The air is discharged from the cooler through ducts 15, 53 and 30 and fan 31, damper 52 being open.

For winter operation the coils 33 and 34 of the coolers and connecting pipes are filled with water, and supply valve 36 closed. Valves 48 and 43 are opened and valves 46 and 49 closed. Circulation is then from coil 33 to coil 34, through pipes 38 and 39 to pump 40 and pipe 41, back to coil 33.

In summer operation, if the cooling water is supplied under any pressure, pump 40 need not be operated. Then valve 43 is closed and valve 49 opened, and the flow is from pipe 39 through pipe 56 to pipe 42.

In the form of the invention illustrated in Fig. 2, air to be dehydrated is supplied through duct 10 and blower 11 to the adsorber 12. Dehydrated air discharged from the adsorber passes through duct or conduit 60, through after cooler 61 of any suitable type, duct 62, and blower 63 from which it is discharged through duct 64, main cooler 65, and duct 66 into the conditioned area 21.

Air is withdrawn from the conditioned area through duct 67 and supplied to duct 62, a damper 68 being disposed in this duct and being normally open during both summer and winter operation.

To activate or regenerate the adsorbent in the adsorber, hot air is employed. For this purpose a boiler 69 supplies hot water to the heating coil 70 of the air heater 71 through pipe 72, the return being by way of pipe 73. Suitable valves 74 and 75 are provided in the pipes 72 and 73 respectively. Air passes through the heater 71 and is delivered by duct 76 through the adsorbent to be activated, and thence through duct 77 to the activating fan 78, which discharges into the atmosphere through a duct 79.

The cooling coil 80 of the main cooler is supplied with water through pipe 81 controlled by valve 82. From the coil 80, the water flows through pipes 83 and 84 to the cooling coil 85 of the after cooler 61, and is discharged to waste through pipe 86. A valve 87 is provided in pipe 84 to control the flow therein.

For winter, the adsorber is inoperative, and damper 88 in duct 62 is closed so that air is withdrawn from the conditioned area through duct 67, and passed through the main cooler 65 which is converted into a heater to raise the temperature of the air supplied to the conditioned space.

To change the cooler 65 to a heater, valves 82 and 87 are closed and hot water is supplied to the coil 80 from the boiler through pipe 89, valve 90 therein being open and also valve 91. From pipe 89 the hot water is supplied to coil 80 through pipe 92. The water is returned from the coil by way of pipe 93, the valve 94 therein being open. For summer operation, valves 90, 91 and 94 are closed. For winter operation, valves 82, 87, 74 and 75 are closed.

In the form of the invention illustrated by Fig. 3, the air to be dehydrated is supplied through duct 10 to a blower 11 which discharges through the adsorber 12 into a duct or conduit 100. This leads to after cooler 101 of suitable type through which the dehydrated air passes and is delivered by ducts 102, 103, 104 and 105 through a heater 106, (inoperative during summer), and thence by duct 107 through the main cooler 108 and duct 109 to the conditioned area 21. Air is withdrawn from the conditioned space through duct 110 and discharged into duct 103, a damper 111 being provided in this duct and being normally open for both summer and winter operation. A damper 112 is supplied in duct 103, which is opened for summer operation.

During summer the coil 113 of the main cooler 108 is supplied with water from pipe 114 having a valve 115 therein. From the coil 113 water flows through the pipe 116 to the coil 117 of the after cooler 101, the discharge being through pipe 118 to waste.

To activate the adsorbent in the adsorber, hot air from an air heater 119 is conducted by ducts 120 and 121 through the adsorbent and then by way of ducts 122 and 123 to the activating fan 124 which discharges to atmosphere. Damper 125 is provided in duct 121 which, for summer operation is opened and for winter operation is closed. A damper 126 is provided in duct 122 and is opened for summer operation and closed for winter operation.

For winter the adsorber is inoperative and also the coolers 101 and 108. Damper 112 is closed so that air is withdrawn from the conditioned area, passed through a heater 106, and returned to the conditioned space. If desired, outside air may be added through duct 127, controlled by a damper 128. The heater 106 is heated by hot air supplied from the activating air heater 119 through ducts 129 and 130. The heated air discharged from the heater 106 flows through duct 131 to duct 123 and fan 124. A damper 132 is provided in the duct 131 and is closed for summer operation and opened for winter operation.

In the form of the invention shown in Fig. 4 air to be dehydrated is supplied through duct 10 to blower 11 and passes through the adsorber 12. The dehydrated air is discharged through duct 150, the after cooler 151, ducts 152 and 153 to fan 154, thence through duct 155, the main cooler 156 and duct 157 to the conditioned area 21. Air is withdrawn from the conditioned space through duct 158 and discharged into duct 153 where it mixes with the dehydrated air, a suitable damper 159 being provided in duct 158. This damper is normally open for both summer and winter operation. Dampers 160 and 161 are provided in ducts 152 and 155 respectively. For summer operation these dampers are opened, but are closed for winter operation.

Cooling water is supplied to the coil 162 of cooler 156 through pipe 163, having a valve 164 therein. From coil 162, the water is discharged through pipe 165 to the coil 166 of the after cooler 151, from which it flows to waste through pipe 167.

Adsorbent in the adsorber is activated by hot air supplied from heater 168. Heat is furnished for the heater by the combustion gases from a furnace 169, which are delivered to the heater by duct 170 and discharged therefrom by a duct 171. The air to be heated and used for activation is supplied through a duct 172 having a damper 173 therein, which is opened in summer and closed in winter. From duct 172, the air passes through the heater 168 wherein its temperature is raised and then through ducts 174 and 175, the adsorber 12, fan 176 and discharge duct 177. A damper 178 is disposed in duct 175 and is opened for summer operation and closed for winter.

During winter the adsorber is inoperative, and also the coolers 151 and 156, and means is provided to heat the air supplied to the conditioned space. For this purpose, damper 160 is closed, and air withdrawn from the conditioned space flows through ducts 158 and 153 to fan 154, thence by damper 179 in duct 180 to duct 172, damper 173 being closed for winter operation. The air then flows through duct 172, the heater 168, duct 174, duct 181, duct 157, and thence into the conditioned space. Dampers 178 and 161 are closed for this winter operation, and the damper 182 in duct 181 is opened, the same being closed for summer operation.

In the form of the invention illustrated in Fig. 5, air to be dehydrated is supplied through duct 10 to fan 11 which discharges the same through the adsorber 12, thence through duct 200 to after cooler 201, through ducts 202, 203 and 204 to fan 205. The fan discharges through a duct 206 to the main cooler 207 from which conditioned air is supplied by duct 208 to the conditioned area 21. Dampers 209, 210 and 211 are disposed in ducts 202, 203 and 206 respectively. For summer operation, dampers 209, 210 and 211 are open.

Air from the conditioned area is withdrawn through duct 212, having damper 213 therein and supplied to duct 204 where it mixes with the dehydrated air. For summer operation damper 213 is opened but is closed during winter.

Cooling water is supplied to coil 214 of the main cooler 207 through a pipe 215, having a valve 216 therein. From coil 214, the water flows through pipe 217 to the coil 218 of the after cooler 201, and is discharged through pipe 219.

For purposes of activating adsorbent in the adsorber, hot combustion gases are passed through the same. From a furnace 220, the hot combustion gases flow through ducts 221 and 222 to the adsorber, from which they pass through duct 223 to the activating fan 224 that discharges into the atmosphere. A damper 225 is located in duct 222 and is opened for summer operation and closed during winter.

For winter operation, the adsorber is not used nor the coolers 201 and 207. However, air is withdrawn from the conditioned space and heated and returned to the same, mixed, if desired, with fresh air. To raise the temperature of this air, the hot combustion gases from the furnace 220 are passed through duct 226 to heater 227, and then discharged to atmosphere, damper 225 being closed and 221' opened. Air to be heated is withdrawn from the conditioned area through duct 212, and supplied to the heater through duct 228, a damper 229 being disposed in this latter duct. During summer this damper is closed, but is opened for winter operation. If desired, some fresh air may be supplied to duct 228 through duct 230 controlled by damper 231. From heater 227 the hot air passes through duct 232 into duct 202, a damper 233 therein being opened for winter operation and closed during summer. The hot air then passes through ducts 203, 204, 205, by-pass 234, and thence to the conditioned area through duct 208. In order to cause the air to flow through the by-pass, damper 211 is closed and damper 235 in duct 234 is opened, this damper being closed during summer.

In the form of the invention illustrated in Fig. 6, air to be dehydrated is supplied through duct 10 to fan 11, which discharges the same through the adsorber 12. Dehydrated air flows through ducts 250 and 251 to fan 252 which, through duct 253, discharges through the cooler 254. The cooled air then flows through duct 255 into conditioned area 21. A damper 256 is provided in duct 251, the same being opened for summer operation and closed during winter. Air may be withdrawn from the conditioned space through duct 257 and supplied to duct 251, where it is mixed with the dehydrated air, the damper 258 being provided to control the flow therein.

The adsorbent material in the adsorber may be activated by hot combustion gases supplied from a furnace 259. For this purpose, duct 260 conducts the gases to a duct 261, thence through the adsorber and duct 262 to a discharge fan 263. A damper 264 is provided in duct 261, and is opened during summer operation and closed in winter. When damper 264 is closed, the combustion gases pass directly to the stack through duct 265 having a damper 266 therein that is closed during summer and open during winter.

It will be noted that only a single cooler is employed for both the dehydrated and recirculated air. This cooler may be of any suitable type. Where water is employed as the cooling medium, the coil 267 of the cooler may be supplied with cooling water through pipe 268, having valve 269 therein, the discharge being through pipes 270 and 271, the latter having valve 272 therein.

During winter the adsorber is inoperative, and the cooler is used as a heater to raise the temperature of the air supplied to the conditioned area. As shown, the coil 267 of the cooler is connected with boiler 259 by pipes 273 and 274 provided with valves 275 and 276 respectively. During summer operation these valves are closed, but are opened for winter operation and valves 269 and 272 are closed. Hot water or steam from the boiler 259 flows through pipe 273 to the coil 267 and returns by pipe 274.

If desired, during winter operation, fresh outside air may be supplied through duct 277, having a damper 278 therein that is closed during summer operation.

In all forms of the invention described, if desired, some or all of the air withdrawn from the conditioned area may be dehydrated. For this purpose, in each of the figures, the duct connecting with the conditioned area for withdrawing air therefrom is shown as being in communication with the air inlet duct 10 through a duct 300, having a damper 301 therein, by means of which the amount of recirculated air to be dehydrated may be controlled.

From the description of the various forms of the invention, it is apparent, for summer operation that fresh air is dehydrated, cooled, mixed with return air, and the mixture is cooled and introduced into the space to be conditioned. In one form the two coolers are combined. The dehydrator means is activated or regenerated by hot air or hot combustion gases.

During winter, the adsorber is inoperative, but heat from the source of heat supply for summer operation is used to raise the temperature of air supplied to the space, and the heat interchanger employed as a cooler in summer time is used as a heater.

As previously stated, in all forms of the system the adsorber is inoperative during winter. Dampers 25, 88, 112, 160, 209 and 256 are closed and all, or most of the air heated is the recirculated air taken from the space.

Having thus described the invention, what is claimed as new and desired to be secured by Letters Patent is:

1. In a year-round air conditioning apparatus, in combination, a conduit, an adsorber charged with a solid porous adsorbent material adapted to dry air passed therethrough, an after cooler, and a second cooler in said conduit in the order named, a recirculating duct connected with said apparatus between the said coolers, and means to selectively pass hot combustion gases through the adsorber or through the after cooler to heat a fluid therein and supply it to heat the second cooler.

2. The combination with a space to be conditioned, a conduit for supplying air thereto, a water vapor adsorber in said conduit, a heat exchanger in said conduit to cool the air discharged from said adsorber, a recirculating duct connected to said conduit between said exchanger and space, a second heat interchanger in said conduit between the junction thereof with the duct and said space, a source of heated gas, piping and valves to selectively deliver said gas to activate said adsorber or to heat said first interchanger, a source of cooling fluid, piping to deliver said cooling fluid to both said interchangers when the adsorber is in operation and further piping to conduct fluid in a closed circuit between said interchangers when one is being heated.

JAMES M. LEDNUM.